United States Patent
Furusawa et al.

(10) Patent No.: US 11,265,427 B2
(45) Date of Patent: Mar. 1, 2022

(54) IMAGE FORMING APPARATUS AND NOTIFICATION CONTROL METHOD FOR NOTIFYING A DETECTED INTRUDER

(71) Applicant: SHARP KABUSHIKI KAISHA, Sakai (JP)

(72) Inventors: Megumi Furusawa, Sakai (JP); Masayoshi Mizuno, Sakai (JP); Sohichi Yoshimura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/805,190

(22) Filed: Feb. 28, 2020

(65) Prior Publication Data

US 2020/0204691 A1 Jun. 25, 2020

Related U.S. Application Data

(62) Division of application No. 16/198,629, filed on Nov. 21, 2018, now Pat. No. 10,616,423.

(30) Foreign Application Priority Data

Nov. 29, 2017 (JP) .............................. JP2017-228826

(51) Int. Cl.
*H04N 1/00* (2006.01)

(52) U.S. Cl.
CPC ..... *H04N 1/00323* (2013.01); *H04N 1/00488* (2013.01); *H04N 1/00891* (2013.01); *H04N 1/00896* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 4,121,192 | A | 10/1978 | Wilson |
| 2004/0015453 | A1 | 1/2004 | Youngblood et al. |

(Continued)

FOREIGN PATENT DOCUMENTS

| | | |
|---|---|---|
| CN | 106572324 A | 4/2017 |
| JP | H05-219188 A | 8/1993 |

(Continued)

OTHER PUBLICATIONS

Office Action dated Jun. 27, 2019 for U.S. Appl. No. 16/198,629.
Notice of Allowance dated Dec. 3, 2019 for U.S. Appl. No. 16/198,629.

*Primary Examiner* — Lennin R Rodriguezgonzalez
(74) *Attorney, Agent, or Firm* — ScienBiziP, P.C.

(57) ABSTRACT

An image forming apparatus includes a main CPU, and, in an unused period in which the image forming apparatus is not used, the main CPU detects whether or not a person exists within a human detection range, on the basis of an output of a human detection sensor. When a person has been detected, by outputting a notification voice regarding an intruder, which indicates that the intruder has been detected, from a speaker, the main CPU notifies the surroundings of the image forming apparatus and also transmits an electronic mail including a message indicating that the intruder has been detected to an address that has been registered in advance and thereby notifies a user of a terminal of the address of the detection of the intruder.

3 Claims, 8 Drawing Sheets

(56) References Cited

U.S. PATENT DOCUMENTS

2014/0104631 A1  4/2014  Baba
2014/0347187 A1  11/2014  Freathey

FOREIGN PATENT DOCUMENTS

| JP | 2000-332925 A | | 11/2000 |
|----|---------------|---|---------|
| JP | 2003-141668 A | | 5/2003 |
| JP | 2005-328189 A | | 11/2005 |
| JP | 2006-331388 A | | 12/2006 |
| JP | 2007-079692 A | ‡ | 3/2007 |
| JP | 2007-079692 A | | 3/2007 |

‡ imported from a related application

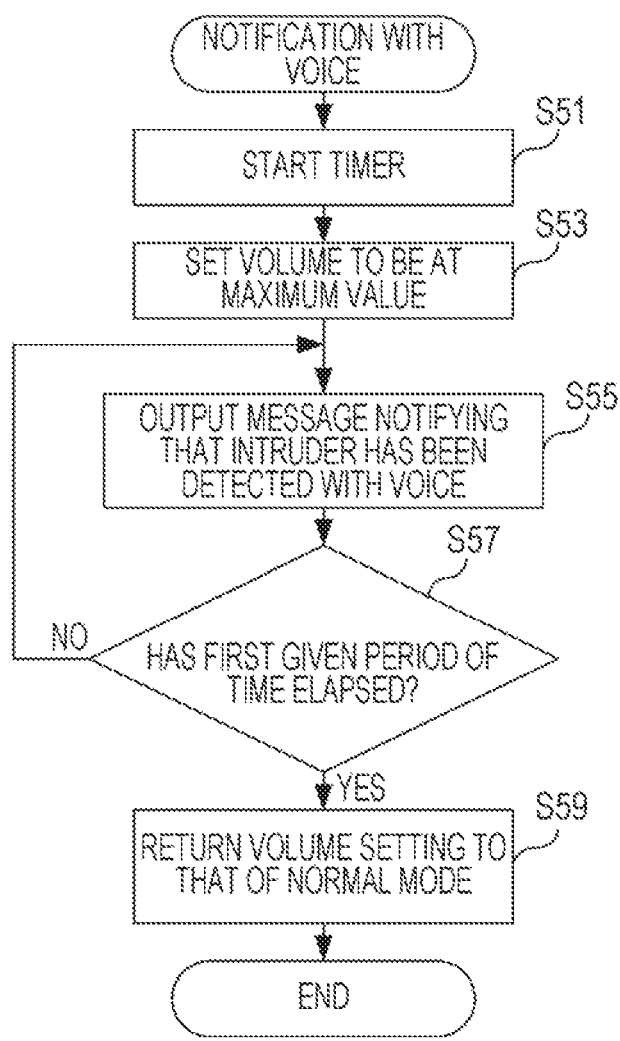

IMAGE FORMING APPARATUS AND NOTIFICATION CONTROL METHOD FOR NOTIFYING A DETECTED INTRUDER

The present application is a divisional application of U.S. patent application Ser. No. 16/198,629, filed on Nov. 21, 2018, which designated the U.S. and claims priority to Japanese Patent Application No. 2017-228826 filed in Japan on Nov. 29, 2017. The present disclosure relates to an image forming apparatus, a storage medium, and a notification control method, and particularly relates to an image forming apparatus, a storage medium, and a notification control method which give a notification that an intruder has been detected, for example.

BACKGROUND

1. Field

2. Description of the Related Art

An example of related arts is disclosed in Japanese Unexamined Patent Application Publication No. 2007-79692. A multifunction peripheral of Japanese Unexamined Patent Application Publication No. 2007-79692 is applicable to a security system, provided with a sensor, which detects a human body, as a monitor unit, and which is connected to a control apparatus via a network. The multifunction peripheral includes a unit informs the control apparatus of a detection result when detecting a human body by the sensor.

However, when a human body is detected by the sensor, the multifunction peripheral disclosed in Japanese Unexamined Patent Application Publication No. 2007-79692 informs the control apparatus of the detection result via the network, and upon reception of the detection result, the control apparatus outputs, to the multifunction peripheral that is a transmission source of the detection result or an apparatus other than the multifunction peripheral, a command to transmit information indicating that the human body has been detected to a different apparatus, and the different apparatus informs a report destination of the information indicating that the human body has been detected, so that a configuration by which the information indicating that the human body has been detected is informed is complicated, and there is yet room for improvement.

The disclosure therefore generally provides an image forming apparatus, a storage medium, and a notification control method that are new.

The disclosure also provides an image forming apparatus, a storage medium, and a notification control method which are able to give a notification, with a simple configuration, that an intruder has been detected.

SUMMARY

An aspect of the disclosure is an image forming apparatus including: a period setting unit that sets an unused period in which the image forming apparatus is not used; a detection unit that detects whether or not an object exists within a given region that is set for the image forming apparatus; and a notification unit that gives a notification that an object has been detected, in a case where existence of the object has been detected by the detection unit in the unused period set by the period setting unit.

Another aspect of the disclosure is a storage medium storing a notification control program that is executed by an image forming apparatus. The notification control program causes a processor of the image forming apparatus to execute: setting an unused period in which the image forming apparatus is not used; detecting whether or not an object exists within a given region that is set for the image forming apparatus; and giving a notification that an object has been detected, in a case where existence of the object has been detected at the detecting in the unused period set at the setting.

Still another aspect of the disclosure is a notification control method including: (a) setting an unused period in which an image forming apparatus is not used; (b) detecting whether or not an object exists within a given region that is set for the image forming apparatus; and (c) giving a notification that an object has been detected, in a case where existence of the object has been detected at (b) in the unused period set at (a).

Features and merits of the disclosure will be further apparent from detailed description of an embodiment, which is given below with reference to drawings.

BRIEF DESCRIPTION OF THE DRAWINGS

FIG. 9 is a flowchart illustrating an example of notification processing with a voice, which is performed by the main CPU illustrated in FIG. 2.

DESCRIPTION OF THE EMBODIMENTS

Figure 1:
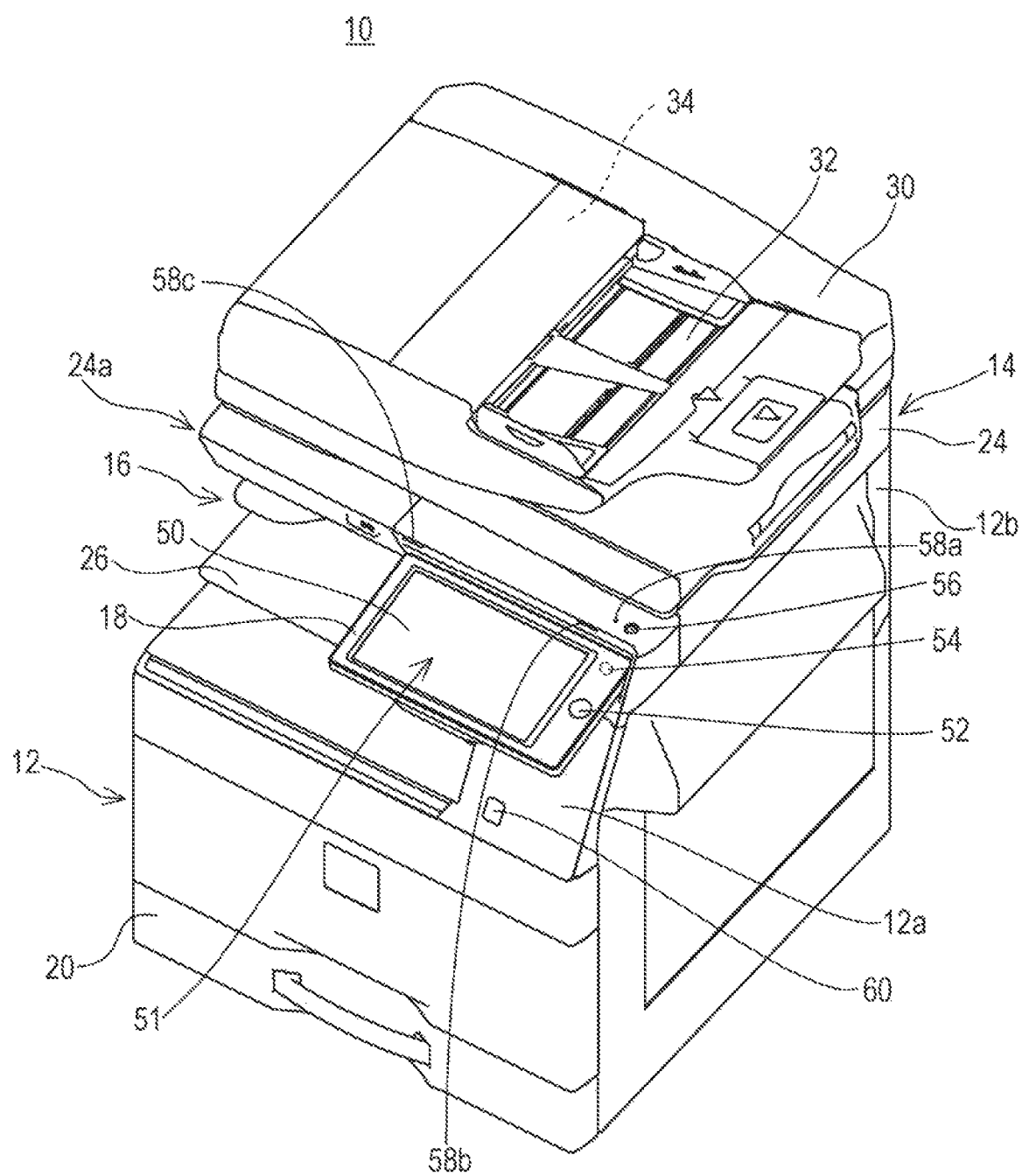
FIG. 1 is a perspective view of an example of an appearance configuration of an image forming apparatus serving as an embodiment of the disclosure, which is viewed obliquely downward.

FIG. 1 is a perspective view of an example of an appearance configuration of an image forming apparatus 10 of an embodiment, which is viewed obliquely downward. Referring to FIG. 1, the image forming apparatus 10 serving as the embodiment of the disclosure is an image forming apparatus of an in-body paper discharging type, which has an in-body paper discharging unit 16 formed between an image forming unit 12 and an image reading unit 14, and includes an operation unit 18 that is provided on a front surface side of the image reading unit 14 as a different unit. As described below, the image forming apparatus 10 forms a multicolored or monochromatic image on a predetermined sheet (recording medium) on the basis of, for example, image data read by the image reading unit 14, and discharges the sheet on which the image is formed to the in-body paper discharging unit 16. In the embodiment, the image forming apparatus 10 is a multifunction peripheral (MFP) that has a copying function, a printer function, a scanner function, a facsimile function, and the like.

Note that, in the embodiment, a back-and-forth direction (depth direction) of the image forming apparatus 10 and components thereof is prescribed by assuming that a surface facing a position at which a user stands, that is, a surface on a side where the operation unit 18 is provided is a front surface, and a right-and-left direction (lateral direction) of the image forming apparatus 10 and the components thereof is prescribed with a state of the image forming apparatus 10, which is viewed from the user, as a reference.

First, a basic configuration of the image forming apparatus 10 will be described. As illustrated in FIG. 1, the image forming apparatus 10 includes the image forming unit 12 and the image reading unit 14 provided above the image forming unit 12.

A housing of the image forming unit 12 includes a first connection housing 12a that is formed in an upper part on a right side and a second connection housing 12b that is formed in an upper part on a deep side, and the image reading unit 14 is supported by the first connection housing 12a and the second connection housing 12b. Thereby, on a lower surface side of the image reading unit 14, the in-body paper discharging unit 16 that is an in-body space in which a sheet subjected to image formation is placed is formed.

The image forming unit 12 includes an exposure unit, a developing device, a photosensitive drum, a charging device, an intermediate transfer belt, a transfer roller, a fixing unit, and the like. The image forming unit 12 forms, by an electrophotographic system, an image on a sheet conveyed from, for example, a paper feeding cassette 20 that is arranged below the image forming unit 12. That is, the image forming unit 12 forms an electrostatic latent image according to image data on the photosensitive drum by the charging device, the exposure unit, and the like, and visualizes the electrostatic latent image, which is on the photosensitive drum, with toner by the developing device. The toner image formed on the photosensitive drum is transferred onto the sheet by the intermediate transfer belt, the transfer roller, and the like, and the toner image transferred onto the sheet is thermally fixed by the fixing unit. Thereafter, the sheet subjected to image formation is discharged to the in-body paper discharging unit 16 from a paper discharging port 22 formed in the first connection housing 12a. Note that, the image data for forming an image on a sheet is image data read by the image reading unit 14, image data transmitted from an external computer, or the like.

The image reading unit 14 includes a housing 24 that has, on an upper surface thereof, a document placing table formed by a transparent material. In the housing 24, a light source, a plurality of mirrors, an image forming lens, a line sensor, and the like are provided. The image reading unit 14 exposes a surface of a document by the light source, guides reflection light reflected by the surface of the document to the image forming lens by the plurality of mirrors, and then forms an image of the reflection light on a light receiving element of the line sensor by the image forming lens. In the line sensor, luminance and chromaticity of the reflection light the image of which is formed on the light receiving element are detected, and image data based on an image of the surface of the document is generated. A CCD (charge coupled device), a CIS (contact image sensor), or the like is used as the line sensor.

A bottom surface and a top surface of the in-body paper discharging unit 16 are respectively partitioned by the housing of the image forming unit 12 and the housing 24 of the image reading unit 14, and a right side surface and a rear surface thereof are respectively partitioned by the first connection housing 12a and the second connection housing 12b. That is, a front surface side and a left side surface side of the in-body paper discharging unit 16 are open. Moreover, the in-body paper discharging unit 16 is provided with a paper discharging tray 26 that receives a sheet which is discharged from the paper discharging port 22 and has been subjected to image formation.

On the upper surface of the image reading unit 14, a document pressing cover 30 is attached via hinge or the like, which is arranged on the deep side, so as to be freely openable/closable. The document pressing cover 30 is provided with an ADF (automatic document feeder) 34 that automatically feeds a document placed on a document placing tray 32 to an image reading position of the image reading unit 14 in a one-by-one manner.

Moreover, the housing 24 of the image reading unit 14 has a housing protrusion 24a that protrudes forward further than a front surface of the document pressing cover 30. That is, a front edge part of the housing 24 protrudes forward further than the front surface of the document pressing cover 30. The operation unit 18 is provided on a front surface side of the housing 24 of the image reading unit 14. A power button 56 is provided at a position which is on an upper surface of the housing protrusion 24a (housing 24) and closer to a right edge of the housing 24. In the embodiment, the power button 56 is arranged at a position where, when the image forming apparatus 10 is viewed from the front surface, the power button 56 is arrayed on a straight line with a home button 52 and a power-saving key 54 that will be described below. The power button 56 is a hardware key of a push button type.

Moreover, an LED 58a is provided on a left side of the power button 56, and, furthermore, an LED 58b is provided at a position which is on a front surface of the housing protrusion 24a and closer to the light edge of the housing 24 and an LED 58c is provided in a center part of the housing 24.

The LED 58a is provided for giving a notification of an on/off state of the power button 56. In a case where the power button 56 is turned on, the LED 58a is turned on, and in a case where the power button 56 is turned off, the LED 58a is turned off.

The LED 58b is provided for giving a notification that an abnormality (error) such as paper shortage, toner shortage, or paper jam occurs. In a case where an error occurs, the LED 58b is turned on, and in a case where no error occurs, the LED 58b is turned off.

The LED 58c is provided for giving a notification of reception of facsimile. The LED 58c is kept to be on during a period of time from when facsimile is received until when a sheet on which a received content is printed is removed, and is turned off in the other case. However, in a case where the received content is not printed but stored in an HDD 88, the LED 58c is turned off after facsimile is received or the received content is stored in the HDD 88.

Furthermore, a human detection sensor 60 is provided on a front surface of the first connection housing 12a. As the human detection sensor 60, a human detecting sensor that, when an object whose temperature is different from temperature of a periphery thereof moves within a detection range, detects presence/absence of a human by detecting the change in temperature by using a pyroelectric sensor (infrared sensor) is usable.

Note that, a position at which the human detection sensor 60 is provided is an example, and the human detection sensor 60 may be provided on the front surface of the housing protrusion 24*a*.

Moreover, as the human detection sensor 60, a distance sensor using laser or an ultrasonic wave or a digital camera (image sensor) using a CCD or a CMOS is also usable. In a case where the distance sensor is used, it is possible to detect an object within a given detection range by a change in a distance, and in a case where the image sensor is used, it is possible to detect a movement of an object within a given detection range by a change (movement) of an image.

In another example, as the human detection sensor 60, a floor sensor (pressure sensor) connected to the image forming apparatus 10 is also usable. In this case, the floor sensor is provided within a range of a floor surface, which corresponds to a human detection range A (refer to FIG. 3) that is set around the image forming apparatus 10, and the image forming apparatus 10 (main CPU 70) determines, on the basis of an output of the floor sensor, whether or not a person (user) exists within the human detection range A.

Although illustration is omitted, a control unit that controls an operation of each portion of the image forming apparatus 10 is provided at a predetermined position of the image forming apparatus 10. The control unit includes a processor (70, 72), a memory (74, 88, 90, 92), a communication circuit (94, 96), and the like that will be described below, and controls each portion of the image forming apparatus 10 in accordance with an input operation to the operation unit 18, which is performed by a user, or the like for causing the image forming apparatus 10 to perform various operations or transmitting/receiving data to/from equipment connected so as to be capable of communication.

The operation unit 18 is also called an operation device or an operation panel, and formed in a rectangular plate shape which is long from side to side. The operation unit 18 is provided so as to be inclined with a front side lowered, in order to allow a user to easily see an upper surface thereof (upper surface of the operation panel). Note that, the operation unit 18 is attached to the housing of the image reading unit 14 so as to be rotatable about an upper edge part of the operation unit 18.

On the upper surface of the operation unit 18, a display 50, a touch panel 51, the home button 52, and the power-saving key 54 are provided. The touch panel 51 is provided above a display surface of the display 50. Moreover, the home button 52 and the power-saving key 54 are provided so as to be arrayed in the back-and-forth direction on a right side of the display 50 and the touch panel 51.

The display 50 is an LCD or an EL display, and an image of a software key with which various types of setting or a printing instruction are/is received from a user, an image (preview image) obtained by scanning, an image (input image) received (acquired) from an external computer or a recording medium, various messages, or the like is/are displayed thereon. The touch panel 51 is a general-purpose touch panel of an electrostatic capacitance system, a resistance film system, an electromagnetic induction system, an infrared system, or the like.

Note that, although the touch panel 51 is provided on the display 50 in the embodiment, a touch panel display in which the display 50 and the touch panel 51 are integrally formed may be provided.

Each of the home button 52 and the power-saving key 54 is a hardware key (operation button) using a switch of an electrostatic capacitance system. The home button 52 is a key by which a home screen is displayed on the display 50.

Note that, the home screen is a screen (basic screen) on which a main menu is displayed, and an image of a key by which each of functions of copying, printing, facsimile, and scanning is selected and an image of a key by which a setting screen for performing detailed setting related to each function and other functions is displayed are displayed.

The power-saving key 54 is a key by which the image forming apparatus 10 is shifted (set) from a normal state (normal mode) to a power-saving state (power-saving mode) or shifted (returned) from the power-saving state to the normal state. Here, the power-saving mode means a state where power is supplied to the power-saving key 54, the LED 58*a*, an LED of a backlight of the power-saving key 54, the main CPU 70, a sub CPU 72, a RAM 74, a RAM 92, a modem 94, an NIC 96, and an RTC 98 in the image forming apparatus 10 and power supply to the other components is turned off (stopped), and an amount of power consumption of the image forming apparatus 10 is suppressed to a predetermined value (for example, 1 W) or less. The normal state (normal mode) is a state where there is no restriction on the power consumption, and means a state where power is supplied to all components except a part of the components, which is not to be operated. For example, power is supplied to a part of the components, such as a motor that drives a paper feeding roller and a conveyance roller or an LED (a backlight of 52, or 58*b* or 58*c*), only in a case where the part is to be operated.

Moreover, when the power button 56 is turned on/off, power of the image forming apparatus 10 is turned on/off. When the power of the image forming apparatus 10 is changed from an off state to an on state, each component of the image forming apparatus 10 is warmed up and set to be in the normal mode. When the power button 56 is turned off, the image forming apparatus 10 is shifted to a maximum power-saving state (maximum power-saving mode) where the power consumption is lowered at a maximum. The maximum power-saving mode means a state where power is supplied to the sub CPU 72, the RAM 92, the modem 94, the NIC 96, and the RTC 98 in the image forming apparatus 10 and power supply to the other components is stopped, and the amount of the power consumption of the image forming apparatus 10 is reduced more than that in the power-saving mode.

Figure 2:
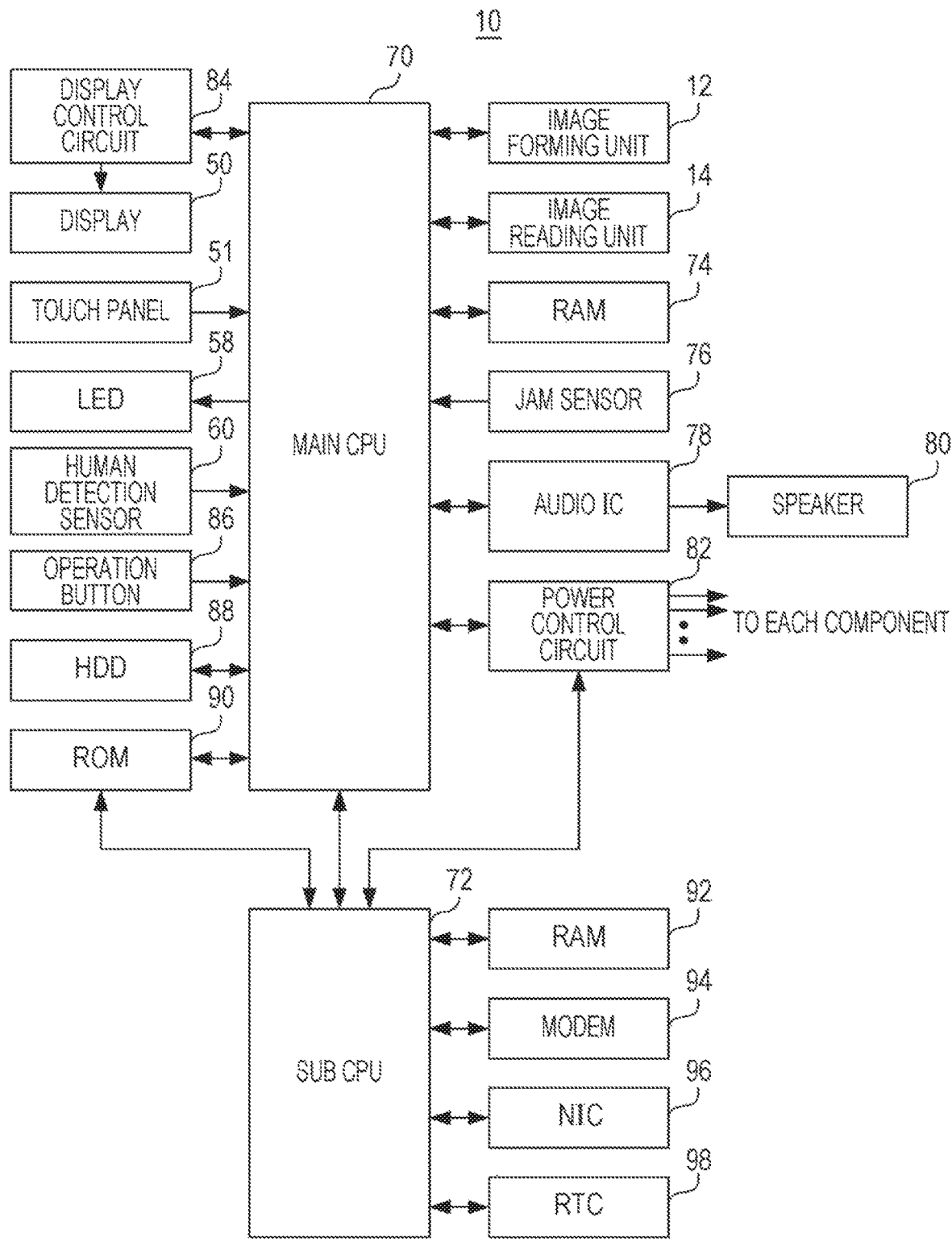
FIG. 2 is a block diagram illustrating an example of an electrical configuration of the image forming apparatus illustrated in FIG. 1.

FIG. 2 is a block diagram illustrating an example of an electrical configuration of the image forming apparatus 10 illustrated in FIG. 1. Note that, a part of the components, which does not directly relate to the present application, is omitted.

As illustrated in FIG. 2, the image forming apparatus 10 includes the main CPU 70 and the sub CPU 72. The main CPU 70 is connected to the image forming unit 12, the image reading unit 14, the touch panel 51, the LEDs 58 (LEDs 58*a*, 58*b*, and 58*c*, and the like), and the human detection sensor 60 which are described above, and connected to the RAM 74, a jam sensor 76, an audio IC 78, a power control circuit 82, a display control circuit 84, an operation button 86, the HDD 88, and a ROM 90. Moreover, the audio IC 78 is connected to a speaker 80, and the display control circuit 84 is connected to the display 50.

The main CPU 70 entirely controls the image forming apparatus 10 in accordance with a program stored in the ROM 90. Moreover, the main CPU 70 executes notification control processing of the embodiment in accordance with a program stored in the ROM 90. The image forming unit 12 and the image reading unit 14 are as described above, so that redundant description thereof will be omitted.

The display 50 is a general-purpose monitor such as a liquid crystal display (LCD). Other general-purpose monitors such as an EL (Electro-Luminescence) display are also usable as the display 50. On the display 50, the home screen which is a screen by which a desired job is selected from among various jobs that are able to be executed by the image forming apparatus 10, a setting screen by which whether or not to use a function provided in the image forming apparatus 10 is set and a detailed content of the function to be used is also set, an operation screen by which the image forming apparatus 10 is operated, a status (operation state) of the image forming apparatus 10, various messages, or the like is/are displayed.

Note that, in the embodiment, a job means scanning, copying (including scanning of a document), printing, transmission of facsimile, transmission of an electronic mail, or the like.

A touch operation (touch input) within a touch effective range of the touch panel 51 is detected, and touch coordinate data indicating a position of the touch input is output to the main CPU 70. The touch panel 51 is a general-purpose touch panel, and one of any system of an electrostatic capacitance system, an electromagnetic induction system, a resistance film system, an infrared system, and the like is usable. In the embodiment, a touch panel of the electrostatic capacitance system is used as the touch panel 51, and the touch panel 51 is provided on the display surface of the display 50 as described above.

The LEDs (display lamp) 58 includes the respective LEDs 58a to 58c and the LEDs used for the backlights of the home button 52 and the power-saving key 54 which are individually turned on, turned off, or caused to flash in accordance with control of the main CPU 70.

As described above, the human detection sensor 60 is a human detecting sensor using the infrared sensor, and the main CPU 70 detects presence/absence of an object (person, user) existing within a given range (human detection range A) on the basis of an output of the human detection sensor 60.

Figure 3:
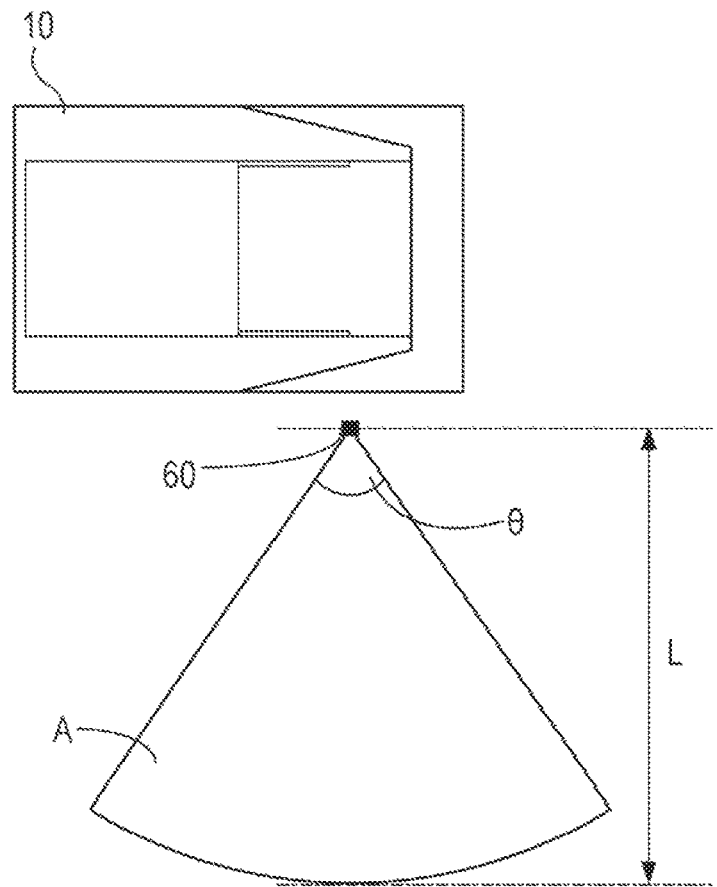
FIG. 3 is a view illustrating an example of a detection range of a human detection sensor provided in the image forming apparatus illustrated in FIG. 1.

FIG. 3 is a plan view for explaining the human detection range A which is set around the image forming apparatus 10. Generally, in a case where the image forming apparatus 10 is in the power-saving mode, when a person (user) existing within the human detection range A is detected on the basis of the output of the human detection sensor 60, the image forming apparatus 10 is shifted to the normal mode from the power-saving mode before a user starts using the image forming apparatus 10, and warming up is started. Accordingly, a time from when the user starts using the image forming apparatus 10 until when the user finishes processing such as scanning or/and printing a document is shortened.

Thus, the human detection range A is set in a range which is on a front side of the image forming apparatus 10 and in which existence of a user who is considered to use the image forming apparatus 10 is able to be detected. In an example illustrated in FIG. 3, the human detection range A in a fan-shape is set in the front side of the image forming apparatus 10 (operation unit 18). A length L of a radius of the fan is able to be appropriately set in accordance with an environment in which the image forming apparatus 10 is installed, but a maximum value thereof is limited on the basis of a maximum detection distance of the human detection sensor 60. A central angle θ of the fan is also able to be appropriately set in accordance with the environment in which the image forming apparatus 10 is installed, but a maximum value thereof is limited on the basis of a maximum viewing angle of the human detection sensor 60, which is in the horizontal direction.

Note that, although illustration is omitted, in order to detect a person such as a user by the human detection sensor 60, the central angle θ in the horizontal direction is set, and a central angle of the human detection sensor 60, which is in the vertical direction, may be set to be a size with which a floor or a ceiling is not detected within the human detection range A.

Returning to FIG. 2, the RAM 74 is used as a work area and a buffer area of the main CPU 70.

The jam sensor 76 is a sensor by which paper jam is detected, and, for example, an optical sensor of a reflection type or a transmission type is usable. The main CPU 70 detects presence/absence of a sheet on the basis of an output of the optical sensor, and, in a case where a state where the sheet is detected continues for a given period of time or more, detects that paper jam occurs. Note that, one jam sensor 76 is illustrated in FIG. 2, but just inclusively illustrates a plurality of jam sensors that are arranged at predetermined positions in a conveyance path of a sheet.

The audio IC 78 reproduces voice data in accordance with an instruction of the main CPU 70, and outputs the reproduced voice from the speaker 80. Accordingly, a sound or a voice (synthesized voice) corresponding to the voice data is output from the speaker 80.

The power control circuit 82 is a control circuit by which power (electric power) is supplied or stopped to each component of the image forming apparatus 10 in accordance with an instruction of the main CPU 70 or the sub CPU 72. The power control circuit 82 steps down and rectifies commercial power and supplies or stops a predetermined DC voltage according to each component.

The display control circuit 84 includes a GPU, a VRAM, and the like. Under an instruction of the main CPU 70, the GPU generates, in the VRAM, display image data, in accordance with which various screens are displayed on the display 50, by using image generation data 304b (refer to FIG. 5) stored in the RAM 74, and outputs the generated display image data to the display 50. Although detailed description will be omitted, the image generation data includes data such as polygon data or texture data.

The operation button 86 includes various keys and buttons such as the home button 52, the power-saving key 54, and the power button 56. The HDD 88 is a main memory of the image forming apparatus 10, and stores various types of data. The ROM 90 stores a program executed by the main CPU 70 or the sub CPU 72 and specific information (model name, serial number) of the image forming apparatus 10.

The sub CPU 72 is connected to the RAM 92, the modem 94, the NIC 96, and the RTC 98. The sub CPU 72 executes communication control processing and power control processing in accordance with a program stored in the ROM 90. The RAM 92 is used as a work area and a buffer area of the sub CPU 72.

The modem 94 is a communication circuit by which transmission/reception of facsimile is performed, and connected to a public telephone line. The NIC (Network Interface Card) 96 is a communication circuit by which communication is performed with another electronic equipment via a network (a LAN or the Internet), and connected to the LAN.

The RTC (Real Time Clock) 98 is a clock circuit that counts time (including Gregorian year, month, date, and time (o'clock, minute, and second)). Although detailed description will be omitted, it is possible to know a day of the week by a calendar function.

Note that, although illustration and detailed description will be omitted in the embodiment, the RTC 98 is connected also to the main CPU 70, and the main CPU 70 also acquires information of time from the RTC 98 in the normal mode.

The image forming apparatus 10 having such a configuration is arranged, for example, at a predetermined position in an office, and the power thereof is turned on and the normal mode is set in working hours. In the normal mode, the image forming apparatus 10 executes copying, printing, transmission/reception of facsimile, or transmission/reception of an electronic mail. However, in the normal mode, in a case where the power-saving key 54 is turned on or in a case where a state where the image forming apparatus 10 is not used continues for a given period of time (for example, 30 minutes), the image forming apparatus 10 is set to be in the power-saving mode. Moreover, in a time zone (unused period), such as out of working hours, in which the image forming apparatus 10 is not used, the power of the image forming apparatus 10 is turned off and the maximum power-saving mode is set.

As described above, when the power button 56 is turned on/off, the power is able to be turned on/off. Moreover, when a user sets a schedule, it is also possible to turn the power of the image forming apparatus 10 on/off by electrical control at set time on a set day of the week.

When a user performs setting, in the unused period in which the image forming apparatus 10 is not used, by using a function provided in the image forming apparatus 10, the image forming apparatus 10 of the embodiment detects presence/absence of an intruder at a position (a place or a region) where the image forming apparatus 10 is installed and, in a case where the intruder has been detected, notifies the surroundings of the image forming apparatus 10 and a user using a predetermined terminal of the intrusion.

In the embodiment, in a case of notifying the surroundings of the image forming apparatus 10 of the detection of an intruder, a voice (notification voice regarding an intruder) of a content indicating that the intruder has been detected is repeatedly output from the speaker 80 for a given period of time (which corresponds to a first given period of time and is, for example, one minute). In this case, the notification voice regarding an intruder is output from the speaker 80 at volume (for example, maximum volume) which is set in advance. The volume of the notification voice regarding an intruder is not the same as volume which is set for transmission or reception of facsimile or error notification in the normal mode.

Note that, the notification voice regarding an intruder is repeatedly output for the given period of time in the embodiment, but may be repeatedly output a predetermined number of times.

Moreover, in the embodiment, in a case of notifying a user using a predetermined terminal that an intruder has been detected, a message (notification message) indicating that the intruder has been detected is transmitted to an address, which is set in advance, by an electronic mail. In a case where a plurality of addresses (mail addresses) are registered, the electronic mail of the notification message is transmitted to each of the addresses. The notification message includes a text sentence indicating that an intruder has been detected and specific information of the image forming apparatus 10 that has detected the intruder. In the specific information of the image forming apparatus 10, in addition to the specific information (model name, serial number) stored in the ROM 90, a device name and a machine code that are assigned to the image forming apparatus 10 by a user, a manager, or the like of the image forming apparatus 10 are described. When a position (a place or a region) where the image forming apparatus 10 is installed is recorded correspondingly to the specific information, on the basis of the notification message, it is possible to specify the image forming apparatus 10 which is a transmission source of the notification message and to know the position (the place or the region) where the image forming apparatus 10 is installed. Accordingly, the position (the place or the region) where the intruder has been detected is specified.

However, in a case where no address is registered, the electronic mail of the notification message is not transmitted.

In this manner, by giving a notification that an intruder has been detected, it is possible to expect an effect that intrusion into the position (the place or the region) where the image forming apparatus 10 is installed is suppressed or use of the image forming apparatus 10 is suppressed in the unused period.

In a state (notification mode) where notification of detection of an intruder is enabled, power is supplied to a component for detecting an intruder, so that the amount of the power consumption is increased compared with a case of the power-saving mode and the case of the maximum power-saving mode. In the notification mode, power is supplied to the human detection sensor 60, the main CPU 70, the sub CPU 72, the RAM 74, the RAM 92, the modem 94, the NIC 96, and the RTC 98 in the image forming apparatus 10, and electric power supply to the other components is stopped.

Moreover, in a case of giving a notification of detection of an intruder, since occurrence of an error such as toner shortage in the image forming apparatus 10 is not to be considered, when designated time for turning the power off, which is set, comes, the power is turned off and the notification mode is set, and presence/absence of an intruder is detected and the intrusion is notified in accordance with the detection of the intruder, as described above.

Figure 4:
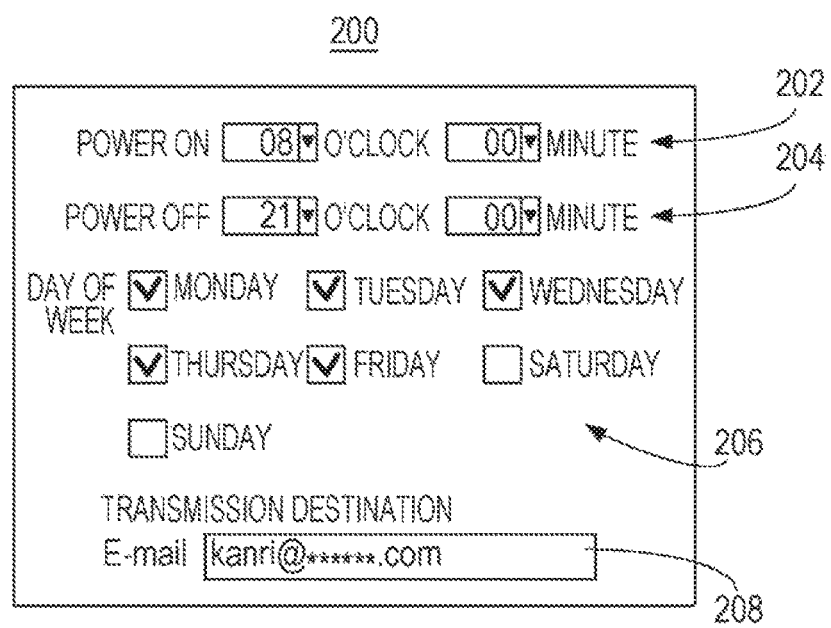
FIG. 4 is a view illustrating an example of a notification setting screen.

FIG. 4 is a view illustrating an example of a setting screen (notification setting screen) 200 by which notification control is executed. The notification setting screen 200 is displayed on the display 50 in accordance with an operation by a user. As illustrated in FIG. 4, the notification setting screen 200 includes setting areas 202, 204, 206, and 208. The setting area 202 is an area in which designated time for turning the power of the image forming apparatus 10 on is set. The setting area 204 is an area in which designated time for turning the power of the image forming apparatus 10 off is set. The designated time for turning the power of the image forming apparatus 10 on or off is able to be selected from a pull-down menu or directly input with use of a software key. The setting area 206 is an area in which a day of the week when notification control processing is executed is set. A user checks a check box of a day of the week when the notification control processing is performed, and unchecks a check box of a day of the week when the notification control processing is not performed. The setting area 208 is an area in which an electronic mail address of a transmission destination (predetermined terminal) to which a notification message is transmitted in the notification control processing is input (set). Although detailed description will be omitted, a plurality of electronic mail addresses of transmission destinations are able to be set as long as the number thereof is within a limit number or the number of characters thereof is within a limit number. Note that, in a case where the electronic mail of the notification message is not transmitted, an address may not be registered.

Figure 5:
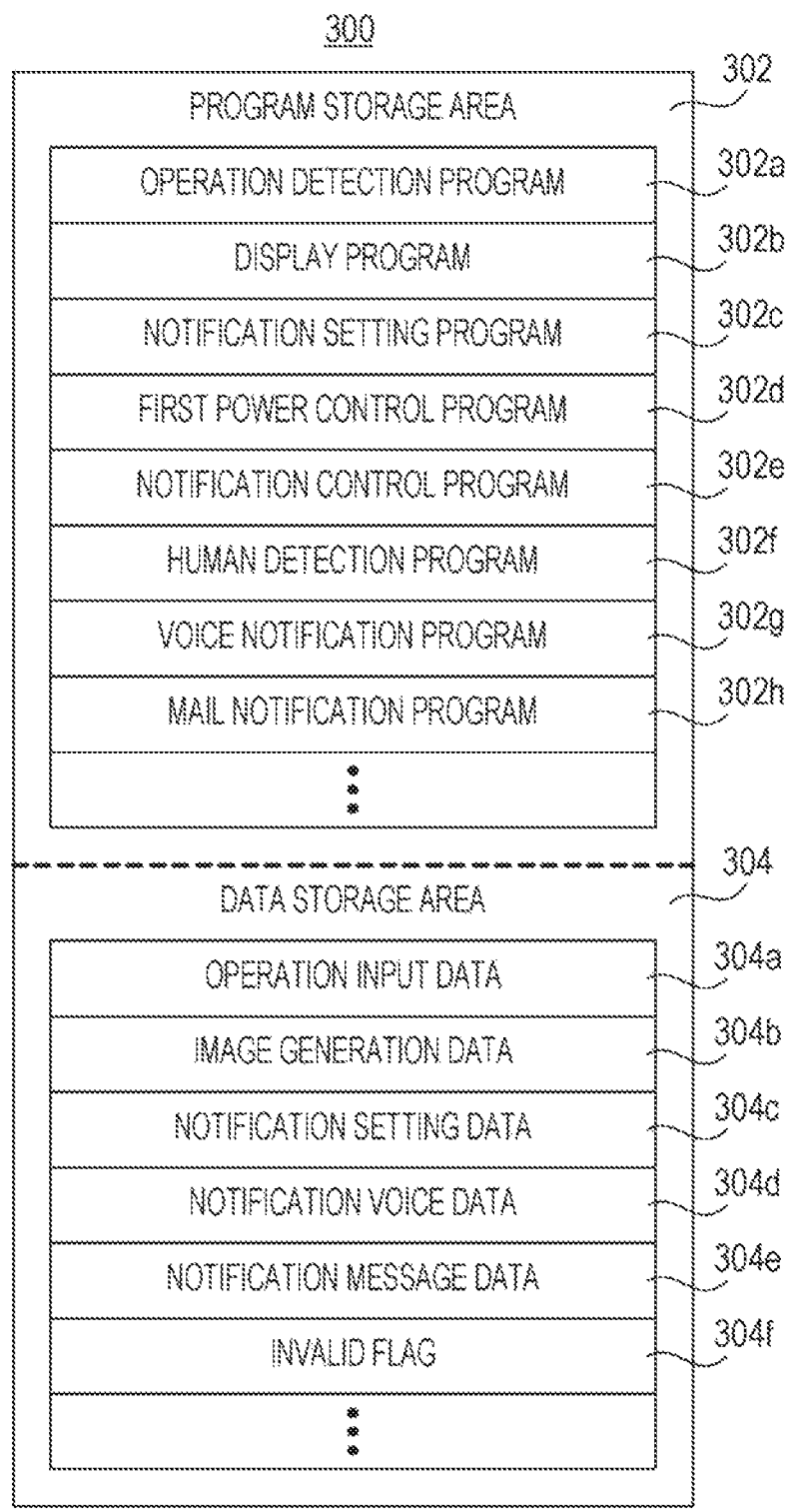
FIG. 5 is a view illustrating an example of a memory map of a RAM that is connected to a main CPU illustrated in FIG. 2.

FIG. 5 is a view illustrating an example of a memory map 300 of the RAM 74 illustrated in FIG. 2. The RAM 74 includes a program storage area 302 and a data storage area 304. The program storage area 302 stores an operation detection program 302a, a display program 302b, a notification setting program 302c, a first power control program 302d, a notification control program 302e, a human detection program 302f, a voice notification program 302g, a mail notification program 302h, and the like.

The operation detection program 302a is a program by which operation input data that is input in accordance with an operation on the touch panel 51 or the power button 56 is detected and stored in the data storage area 304.

The display program 302b is a program by which display image data corresponding to various screens such as the notification setting screen 200 is generated and the generated display image data is output to (displayed on) the display 50.

The notification setting program 302c is a program by which various setting items in the notification setting screen 200, which are displayed on the display 50, are decided (changed) in accordance with an operation by a user. A content (notification setting data 304c) of the decided notification setting is saved in the HDD 88 by the main CPU 70. Note that, the notification setting screen 200 is displayed on the display 50 in accordance with the display program 302b.

The first power control program 302d is a program by which, upon an operation on the power-saving key 54, the power control circuit 82 is controlled to supply or stop power to each of the components so as to set the image forming apparatus 10 to be in the power-saving mode or the normal mode and, upon turning on/off of the power button 56, the power control circuit 82 is controlled to supply or stop power to each of the components so as to set the image forming apparatus 10 to be in the maximum power-saving mode or the normal mode.

Moreover, the first power control program 302d is also a program by which, in a case where the image forming apparatus 10 is continuously unused in the normal mode for a given period of time (for example, 30 minutes) or more, the power control circuit 82 is controlled to supply or stop power to each of the components so as to automatically set the image forming apparatus 10 to be in the power-saving mode.

Further, the first power control program 302d is also a program by which, in a case where the notification control processing is not being executed, when the designated time for turning the power off comes, power is supplied or stopped to each of the components so as to set the maximum power-saving mode.

Furthermore, the first power control program 302d is also a program by which, in a case where the notification control processing is being executed, when the designated time for turning the power off comes, the power control circuit 82 is controlled to supply or stop power to each of the components so as to set the image forming apparatus 10 to be in the maximum power-saving mode and then to supply or stop power to each of the components so as to set the image forming apparatus 10 to be in the notification mode. Note that, since the notification control processing is executed by the main CPU 70, when the designated time for turning the power off comes, power is controlled to set the maximum power-saving mode, but power supply to the main CPU 70 is not stopped.

Figure 7:
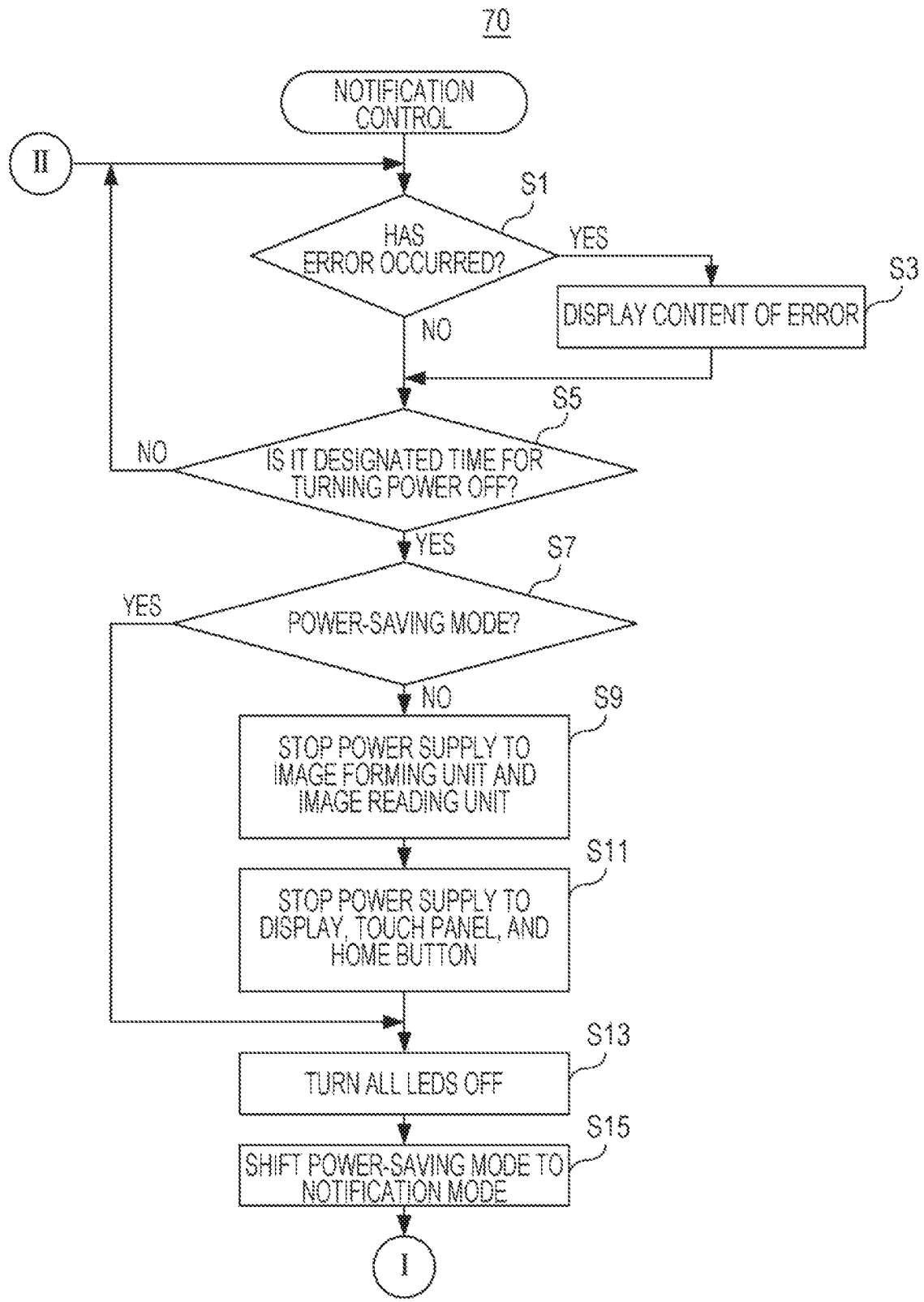
FIG. 7 is a flowchart illustrating a part of an example of notification control processing performed by the main CPU illustrated in FIG. 2.

Note that, when the power button 56 is turned off or when the designated time for turning the power off comes, components power supply to which is to be stopped are partially different between a case where the normal mode is set and a case where the power-saving mode is set (refer to FIG. 7).

Moreover, the first power control program 302d is also a program by which, in accordance with control of the sub CPU 72, the power control circuit 82 is controlled to supply or stop power to each of the components so as to set the image forming apparatus 10 to be in the normal mode.

The notification control program 302e is a program by which the notification control processing in which presence/absence of a person (user) is detected on the basis of an output of the human detection sensor 60 in the unused period when the image forming apparatus 10 is not used and, in a case where the person is detected, the detection of the intruder is notified to the surroundings of the image forming apparatus 10 and a user of a terminal an address of which is registered in advance is executed. Note that, in a case where no address is registered, the notification control program 302e notifies only the surroundings of the image forming apparatus 10 of the detection of the intruder with a voice.

The human detection program 302f is a program by which an object (person, user) existing within the human detection range A that is set around the image forming apparatus 10 is detected. The voice notification program 302g is a program by which detection of an intruder is notified with a voice. The mail notification program 302h is a program by which a message which gives a notification that an intruder has been detected is transmitted to an address, which has been registered in advance, by an electronic mail.

Note that, although illustration is omitted, the program storage area 302 also stores, for example, a program by which various functions are executed by the main CPU 70.

In the data storage area 304 of the RAM 74, operation input data 304a, the image generation data 304b, the notification setting data 304c, notification voice data 304d, notification message data 304e, an invalid flag 304f, and the like are stored.

The operation input data 304a is touch coordinate data and/or operation data that are/is detected (acquired) in accordance with the operation detection program 302a. The detected touch coordinate data and/or operation data are/is stored in the data storage area 304 in time series.

The image generation data 304b is image data that includes polygon data, texture data, or the like in accordance with which display image data about various screens, such as the notification setting screen 200, which are displayed on the display 50 is generated.

The notification setting data 304c is data about notification setting and, specifically, data of time for turning the power on and turning the power off, a day of the week, and a mail address of a transmission destination which are set in the notification setting screen 200 illustrated in FIG. 4. For example, when the notification control processing is started, the notification setting data 304c is read from the HDD 88 and stored in the data storage area 304 of the RAM 74.

The notification voice data 304d is data about a notification voice (synthesized voice) regarding an intruder. As described above, the notification message data 304e is data about the notification message that gives a notification, by an electronic mail, that an intruder exists. For example, when the notification control processing is started, the notification voice data 304d and the notification message data 304e are read from the HDD 88 and stored in the data storage area 304 of the RAM 74.

The invalid flag 304f is a flag by which whether or not the human detection sensor 60 is invalid is determined. In a case where the invalid flag 304f is on, the human detection sensor 60 is invalid, and, in a case where the invalid flag 304f is off, the human detection sensor 60 is valid. For example, in a case where the human detection sensor 60 is invalid, the main CPU 70 ignores an output of the human detection sensor 60, and, in a case where the human detection sensor 60 is valid, the main CPU 70 determines, on the basis of the output of the human detection sensor 60, whether or not a person exists within the human detection range A. Note that, in a case where an intruder is detected in the notification mode, the human detection sensor 60 is made invalid for a given period of time (which corresponds to a second given period of time and is, for example, several minutes to several tens of minutes). In the embodiment, in the case where the human detection sensor 60 is invalid, the output of the human detection sensor 60 is to be ignored, but power supply to the human detection sensor 60 may be stopped instead.

The human detection sensor 60 is made invalid in this manner in order to avoid that, when an intruder is detected, the same intruder is repeatedly detected and the detection of the intruder is notified every time.

Note that, although illustration will be omitted, in the data storage area 304, another data for execution of entire control processing of the image forming apparatus 10 is stored and a timer (counter) and a register for execution of the entire control processing are provided.

Figure 6:
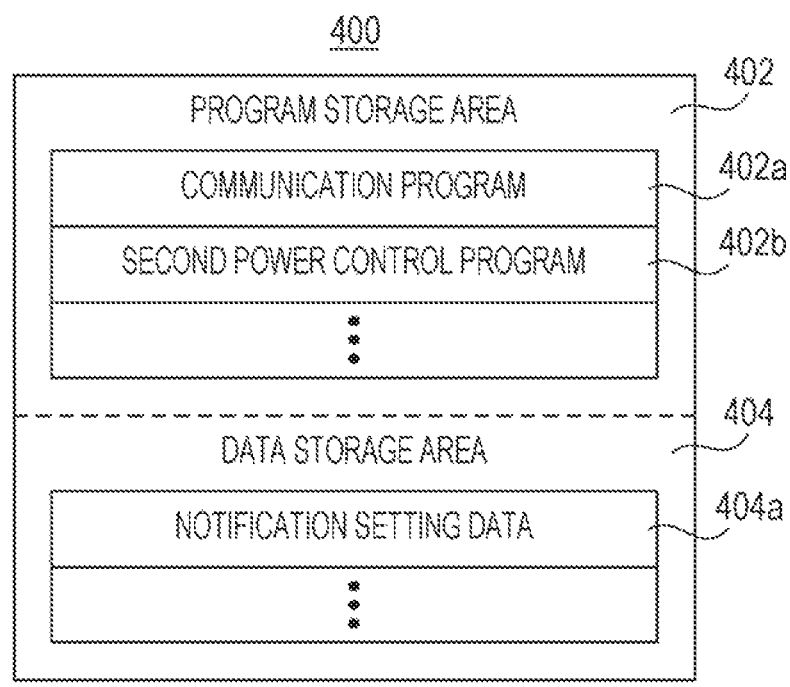
FIG. 6 is a view illustrating an example of a memory map of a RAM that is connected to a sub CPU illustrated in FIG. 2.

FIG. 6 is a view illustrating an example of a memory map 400 of the RAM 92 illustrated in FIG. 2. The RAM 92 includes a program storage area 402 and a data storage area 404.

A communication program 402a includes a program by which facsimile communication is executed by using the modem 94 and a program by which network communication is executed by using the NIC 96. Moreover, the communication program 402a is also a program by which, in response to a request for an external job, execution of the external job is instructed to the main CPU 70.

A second power control program 402b is a program by which, when the designated time for turning the power on comes, the main CPU 70 is instructed to set the image forming apparatus 10 to be in the normal mode. Thus, the main CPU 70 controls the power control circuit 82 to supply or stop power to each of the components so as to set the image forming apparatus 10 to be in the normal mode.

Note that, although illustration will be omitted, in the program storage area 402, a program by which various functions are executed by the sub CPU 72 is also stored, for example.

In the data storage area 404 of the RAM 92, notification setting data 404a and the like are stored.

The notification setting data 404a is the same as the notification setting data 304c described above, so that redundant description thereof will be omitted.

Figure 8:
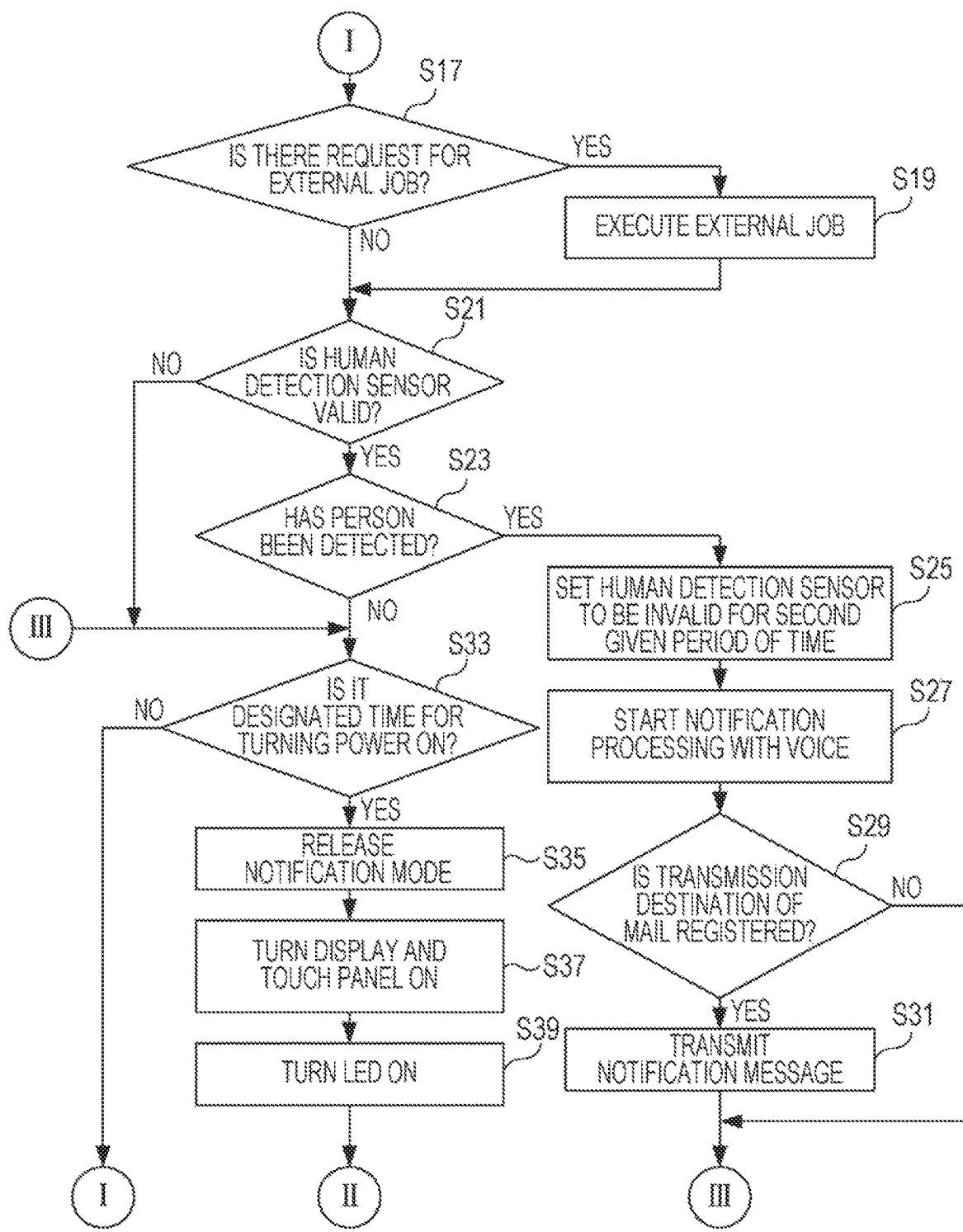
FIG. 8 is a flowchart illustrating another part of the notification control processing performed by the main CPU illustrated in FIG. 2, which succeeds to FIG. 7.

FIGS. 7 and 8 illustrate an example of a flowchart of the notification control processing performed by the main CPU 70 illustrated in FIG. 2. Note that, the main CPU 70 executes overall processing of the image forming apparatus 10 and also executes processing under an instruction from the sub CPU 72.

As illustrated in FIG. 7, when the notification control processing is started, at step S1, the main CPU 70 determines whether or not an error has occurred. Here, the main CPU 70 determines whether or not an error such as paper jam, toner shortage, or sheet shortage has occurred. For example, the main CPU 70 determines whether or not paper jam has occurred, on the basis of an output of the jam sensor 76. Moreover, the main CPU 70 determines whether or not toner is short, by calculating a usage amount of the toner. Furthermore, the main CPU 70 determines whether or not sheet shortage has occurred in a sheet cassette or a sheet tray, on the basis of an output of the optical sensor or a machine sensor.

In a case of "YES" at step S1, that is, in a case where an error has occurred, a content of the error is displayed at step S3, and the procedure proceeds to step S5. At step S3, the main CPU 70 displays an error occurrence screen on the display 50. For example, an image that informs a site where the error has occurred and a message that informs the content of the error are displayed on the error occurrence screen.

On the other hand, in a case of "NO" at step S1, that is, in a case where no error has occurred, whether or not designated time for turning the power off has come is determined at step S5. Here, the main CPU 70 determines whether or not present time informed from the RTC 98 has become time for turning the power off, which is included in the notification setting data 304c. At this time, not only the designated time for turning the power off, but also whether or not it is a day of the week when the notification control processing is to be executed is determined.

In a case of "NO" at step S5, that is, in a case where the designated time for turning the power off has not come, the procedure returns to step S1. On the other hand, in a case of "YES" at step S5, that is, in a case where the designated time for turning the power off has come, whether or not the power-saving mode is set is determined at step S7. In a case of "YES" at step S7, that is, in a case where the power-saving mode is set, the procedure proceeds to step S13. On the other hand, in a case of "NO" at step S7, that is, in a case where the normal mode is set, the power control circuit 82 is instructed to stop power supply to the image forming unit 12 and the image reading unit 14 at step S9 and to stop power supply to the display 50, the touch panel 51, and the home button 52 at step S11, and the procedure proceeds to step S13.

At step S13, the power control circuit 82 is instructed to turn all the LEDs 58 off. Accordingly, in a state where processing at step S13 has been finished, power supply to the components other than the power button 56, the main CPU 70, the sub CPU 72, the RAM 74, the RAM 92, the modem 94, the NIC 96, and the RTC 98 in the image forming apparatus 10 is stopped. At next step S15, the power-saving mode is shifted to the notification mode. Here, the main CPU 70 supplies power also to the human detection sensor 60, and shifts to a state where notification is enabled in a case where an intruder is detected.

As illustrated in FIG. 8, at subsequent step S17, whether or not there is a request for an external job is determined. Here, the main CPU 70 determines whether or not to be instructed to execute an external job such as execution of printing, reception of facsimile, or reception of an electronic mail by the sub CPU 72.

In a case of "YES" at step S17, that is, in a case where there is a request for an external job, the requested (instructed) external job is executed at step S19, and the procedure proceeds to step S21. Accordingly, the main CPU 70 controls the power control circuit 82 to start power supply to a component for execution of the external job and executes the external job instructed by the sub CPU 72.

Subsequently, whether or not the human detection sensor 60 is valid is determined at step S21. Here, the main CPU 70 determines whether or not the invalid flag 304f is off. In a case of "NO" at step S21, that is, in a case where the invalid flag 304f is on and the human detection sensor 60 is invalid, the procedure proceeds to step S33. On the other hand, in a case of "YES" at step S21, that is, in a case where the invalid flag 304f is off and the human detection sensor 60 is valid, whether or not a person (object) has been detected is determined at step S23. Here, the main CPU 70 determines whether or not a person exists within the human detection range A, on the basis of an output of the human detection sensor 60.

In a case of "YES" at step S23, that is, in a case where a person has been detected, the human detection sensor 60 is set to be invalid for the second given period of time at step S25. Here, the main CPU 70 turns the invalid flag 304f on.

At subsequent step S27, notification processing (refer to FIG. 9) with a voice, which will be described below, is started. Subsequently, whether or not a transmission destination of a mail is registered is determined at step S29. That is, the main CPU 70 refers to the notification setting data 304c to determine whether or not an electronic mail address is registered.

In a case of "NO" at step S29, that is, in a case where no transmission destination of a mail is registered, the procedure proceeds to step S33. On the other hand, in a case of "YES" at step S29, that is, in a case where a transmission destination of a mail is registered, the notification message is transmitted at step S31, and the procedure proceeds to step S33. Accordingly, the main CPU 70 acquires a mail address of a destination from the notification setting data 304c, creates an electronic mail in which the notification message indicated by the notification message data 304e is described in a body, and instructs the sub CPU 72 to transmit the created electronic mail via the NIC 96.

Moreover, in a case of "NO" at step S23, that is, in a case where no person is detected, whether or not it is designated time for turning the power on is determined at step S33. Here, the sub CPU 72 determines whether or not present time informed from the RTC 98 becomes the designated time for turning the power on, which is included in the notification setting data 404a. At this time, in addition to the designated time for turning the power on, whether or not it is a day of the week when the notification control processing is to be executed is also determined. Then, the sub CPU 72 informs the main CPU 70 of a determination result.

In a case where "NO" at step S33, that is, in a case where it is not the designated time for turning the power on, the procedure returns to step S17. On the other hand, in a case of "YES" at step S33, that is, in a case where it is the designated time for turning the power on, the notification mode is released at step S35. Here, the main CPU 70 instructs the power control circuit 82 to stop power supply to the human detection sensor 60. The display 50 and the touch panel 51 are turned on at subsequent step S37, the LED 58 (in this case, the backlight of the home button 52 and the LED 58a) is turned on at step S39, and the procedure returns to step S1 illustrated in FIG. 7.

FIG. 9 is a flowchart illustrating an example of the notification processing with a voice, which is performed by the main CPU 70 illustrated in FIG. 2. The main CPU 70 executes the notification processing with a voice in parallel to the notification control processing illustrated in FIGS. 7 and 8.

As illustrated in FIG. 9, when the notification processing with a voice is started, the main CPU 70 starts the timer at step S51. Although illustration is omitted, the timer (counter) is provided in the RAM 74.

At subsequent step S53, volume of the speaker 80 is set to be at a maximum value. At subsequent step S55, a message giving a notification that an intruder has been detected is output with a voice. Here, under an instruction of the main CPU 70, the audio IC 78 reproduces the notification voice data 304d, and the notification voice regarding an intruder according to the notification voice data 304d is thereby output from the speaker 80 at the volume having the maximum value set at step S53.

Note that, as described above, the volume of the voice output from the speaker 80 is set to be at the maximum value at step S53 regardless of a setting value (including mute) of volume in the normal mode. However, the volume is not to be set at the maximum value, and a user may set desired volume.

Subsequently, whether or not the first given period of time (for example, one minute) has elapsed is determined at step S57. In a case of "NO" at step S57, that is, in a case where the first given period of time has not elapsed, the procedure returns to step S55. In a case of "YES" at step S57, that is, in a case where the first given period of time has elapsed, volume setting is returned to that of the normal mode at step S59, and the notification processing with a voice ends.

Note that, since a reproducing time of the voice according to the notification voice data 304d is six to eight seconds, the notification voice regarding an intruder is repeatedly output until the processing at steps S55 and S57 spends the first given period of time.

According to the embodiment, when the image forming apparatus 10 is not used, an intruder is detected by using a function provided in the image forming apparatus 10 and the detection of the intruder is notified to the surroundings of the image forming apparatus 10 and/or a user of a terminal of a registered address, so that it is possible to give a notification, with a simple configuration, that an intruder has been detected.

Note that, although, when an intruder has been detected, the notification voice regarding an intruder is repeatedly output for the first given period of time in the embodiment, the output of the notification voice regarding an intruder may be capable of being stopped in the middle. For example, the output of the notification voice regarding an intruder is stopped when predetermined one or more buttons are pressed or a predetermined password is input. Thereby, a person, such as a manager, who is not an intruder is able to stop the output of the notification voice regarding an intruder in the middle.

Moreover, although, when an intruder has been detected, the notification voice regarding an intruder is repeatedly output for the first given period of time in the embodiment, the notification voice regarding an intruder may be output once. Alternatively, depending on circumstances, the notification voice may not be output and only an electronic mail of the notification message may be transmitted. This is because there is also a case where it is simply desired to detect whether or not the image forming apparatus 10 is used in the unused period and to change setting of the unused period.

In addition, although the notification voice regarding an intruder is output in the embodiment, a predetermined sound or predetermined melody may be output instead of the voice.

Furthermore, although description has been given in the embodiment for a case where detection of an intruder is notified with a voice and/or an electronic mail even when an error such as paper jam, toner shortage, or sheet shortage occurs, also in a case where any kind of malfunctions is caused in the image forming apparatus 10, it is determined that an error occurs.

Moreover, in the embodiment, a range in which an intruder is detected is set to be the same as the human detection range A in which a person (user) is detected in order that the image forming apparatus 10 is caused to recover from the power-saving mode to the normal mode, but may be set (changed) to a given size such as a maximum size when the notification control processing is executed. For example, the human detection range A may be set to have a distance shorter than the maximum detection distance of the human detection sensor 60 in the normal mode, and the human detection range A may be set to have the maximum detection distance of the human detection sensor 60 in the notification mode. In this case, when the central angle θ of the fan-shape of the human detection range A is able to be changed, upon the change from the normal mode to the notification mode, the central angle θ may also enlarged.

In addition, any of the specific configurations cited in the present specification is merely an example, and is able to be appropriately modified in accordance with specifications of an actual product. For example, the notification control processing described in the embodiment is able to be executed also in an image forming apparatus which is provided with a voice output function and an electronic mail function and in which a printing device (image forming unit 12), a fax machine, and a scanner (image reading unit 14), or any two devices of them are integrally provided.

The present disclosure contains subject matter related to that disclosed in Japanese Priority Patent Application JP 2017-228826 filed in the Japan Patent Office on Nov. 29, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus comprising:
period setting circuitry that sets an unused period in which the image forming apparatus is not used;
a detection sensor that detects whether or not an object exists within a given region that is set for the image forming apparatus;
notification circuitry that gives a notification indicating the object has been detected, when existence of the object has been detected by the detection sensor in the unused period set by the period setting unit; and
activating circuitry that activates the detection sensor, when the unused period set by the period setting circuitry starts,
wherein the notification circuitry transmits a notification message to an address, which has been registered in advance, by an electronic mail,
wherein the notification message includes a text sentence indicating that an intruder has been detected and specific information of the image forming apparatus that detected the intruder.

2. An image forming apparatus comprising:
period setting circuitry that sets an unused period in which the image forming apparatus is not used;
a detection sensor that detects whether or not an object exists within a given region that is set for the image forming apparatus;
notification circuitry that gives a notification indicating the object has been detected, when existence of the object has been detected by the detection sensor in the unused period set by the period setting unit;
activating circuitry that activates the detection sensor, when the unused period set by the period setting circuitry starts,
further comprising invalidating circuitry that invalidates the detection sensor for a second given period of time, when the object is detected by the detection sensor.

3. An image forming apparatus comprising:
period setting circuitry that sets an unused period in which the image forming apparatus is not used;
a detection sensor that detects whether or not an object exists within a given region that is set for the image forming apparatus;
notification circuitry that gives a notification indicating the object has been detected, when existence of the object has been detected by the detection sensor in the unused period set by the period setting unit;
activating circuitry that activates the detection sensor, when the unused period set by the period setting circuitry starts;
reception circuitry that receives a request for an external job; and
execution circuitry that executes the external job, when the request for the external job is received by the reception unit in the unused period set by the period setting circuitry.

* * * * *